United States Patent [19]

McNeel

[11] 4,144,520
[45] Mar. 13, 1979

[54] GEOPHONE HAVING ELECTROMAGNETIC DAMPING MEANS

[75] Inventor: William O. McNeel, Houston, Tex.

[73] Assignee: Geo Space Corporation, Houston, Tex.

[21] Appl. No.: 765,272

[22] Filed: Feb. 3, 1977

[51] Int. Cl.² .............................................. G01V 1/16
[52] U.S. Cl. ................................................ 340/17 SP
[58] Field of Search ............... 340/17 R, 17 SP, 8 LF

[56] References Cited

U.S. PATENT DOCUMENTS

| | | | |
|---|---|---|---|
| 2,788,511 | 4/1957 | Marshall | 340/17 SP |
| 2,788,512 | 4/1957 | Reichert | 340/17 R |
| 3,239,804 | 3/1966 | Elskamp et al. | 340/17 SP |
| 3,349,366 | 10/1967 | Hanff | 340/17 R X |
| 3,602,490 | 8/1971 | Mueller et al. | 340/17 SP |
| 3,913,063 | 10/1975 | Sears | 340/17 R |

*Primary Examiner*—Theodore M. Blum
*Attorney, Agent, or Firm*—Daniel J. Meaney, Jr.

[57] ABSTRACT

A geophone for sensing vibrations having a metal housing, a permanent magnet positioned in the center of the housing with a predetermined spacing between the exterior of the permanent magnet and the housing, a spring assembly having a pair of disc shaped deflectable torsion springs, one of which is located between the top of the permanent magnet and the top of the housing and the other of which is located between the bottom of the permanent magnet and the bottom of the housing, and a coil form fabricated from an electrically conductive material, which coil form is positioned in the predetermined spacing between the housing and magnet and which is adapted to enclose the permanent magnet, the coil form ends being adapted to engage and cooperate with the pair of disc shaped springs for movement of the coil form in a direction substantially parallel to the axis of the permanent magnet and wherein the coil form further includes a surface contiguous the housing defining at one end thereof a pair of spaced parallel axially aligned circumferentially extending walls defining a passageway which encloses a wire coil and having at the other end thereof a solid section formed of the electrically conductive material is shown.

7 Claims, 13 Drawing Figures

GEOPHONE HAVING ELECTROMAGNETIC DAMPING MEANS

BACKGROUND OF THE INVENTION

1. Field of the Invention

This invention relates to a novel and improved vibration sensing transducer and in particular relates to a geophone having a wide frequency range of operation wherein the damping means includes electrical magnetic damping means to suppress undesired movements of the coil form in a direction substantially parallel to the axis of the permanent magnet.

Vibration sensing transducers, geophones, seismometers, and other similar devices are widely used in a number of applications. One application is in the geophysical field for gathering seismic data used in determining the geophysical characteristics such as used in fossil fuel exploration. Other applications include an intrusion and detecting system wherein ground vibrations generated by personnel or vehicular activity can be sensed and detected.

2. Disclosure of the Prior Art

It is known in the prior art to provide mechanical and electrical damping means for controlling the damping of movable components in a geophone. A geophone senses vibrations by means of transporting a coil of electrical conductors relative to a fixed permanent magnet in response to sensed vibrations. The coil of electrical conductors transverses the magnetic flux lines of a permanent magnet and generates an electrical signal which is responsive in frequency and magnitude to that of the sensed vibration. In such geophones, the coil of electrical conductors is supported by a movable member generally referred to as a coil form. In assignee's U.S. Pat. No. 3,577,184, a coil form which is adapted to rotate within the geophone is disclosed. The coil form disclosed in U.S. Pat. No. 3,577,184 is adapted to support two identical axially aligned coils of electric conductors. The magnitude of the electrical signal generated by the geophone is enhanced by electrically connecting the coils in series aiding.

In assignee's French Pat. No. 2,108,492, a geophone having a coil form adapted for supporting a single coil of electrical conductors is disclosed. The coil form disclosed in French Pat. No. 2,108,492 has a paid of aligned slots around the periphery of one edge of the coil form, which slots cooperate with a pair of pins mounted in the cover of the geophone housing to prevent rotation of the coil form during the sensing of vibrations. In this device, the pins function to prevent rotation of the coil form to avoid exceeding the elastic limit of the springs which, if this occurred, would result in misoperation of the geophone.

The frequency range in which geophones or other vibration sensing transducers are utilized are generally in the order of about one Hz or higher. The frequency range is controllable and is dependent upon a number of factors which include, without limitation, the spring constant (established by the length and width of spring arms, thickness of the spring material, the amount of pre-forming or pre-stressing of the spring arms) and the relationship of the moving mass to the spring constant as defined by the equation $w = \sqrt{(K/M)}$. As the resonant frequency of the vibration sensing transducers increases, there is a significant drop in the open circuit damping defined as $b_o$, which may also be expressed as raction of critical damping defined as $C_c$. For purposes hereof, critical damping B is defined by the formula:

$$C_c = 2\sqrt{KM},$$

wherein
wherein: K = spring constant, and
M = mass of the coil form.

In the known prior art devices, increasing the mass of the spring mass system generally has the effect of decreasing the damping characteristics of the system. In addition, as the resonant frequency of the system is increased, the decrease in damping is further accentuated. Thus, the prior art devices, when operated at higher frequencies, result in damping characteristics which are substantially lower than desired.

SUMMARY OF THE INVENTION

The present invention overcomes certain of the disadvantages of the prior art vibration sensing transducers, seismometers, and geophones. One advantage of the present invention is that the geophone described herein utilizes a coil form which is resiliently supported for a movement in a direction substantially parallel to the axis of the permanent magnet. The movement of the coil form is responsive to a sensed vibration. The coil form has at one end thereof a passageway for supporting a coil in spaced axial alignment to the permanent magnet. The other end of the coil form has a band of highly conductive metal positioned therearound and in axial alignment with the permanent magnet. The band of metal is responsive to transversing the magnetic lines of force from a permanent magnet to generate an electromotive force and current therein which produces a magnetic field acting in a direction opposite to the direction of transverse of the coil form causing damping of movement of the coil form relative to the permanent magnet.

In the present invention, the coil form is positioned in a space defined by the interior of the geophone housing and the exterior of a permanent magnet. In the prior art devices described above, total damping characteristics are a function of: (i) the open circuit electrical damping characteristics of the geophone; and (ii) electrical damping characteristics developed by electrically connecting a shunt resistor cross the coils to cause a predetermined amount of damping current to flow. In a geophone having two axially aligned coils, the coil form wall is relatively thin in order to reduce the mass thereof. The two coils are electrically connected in series aiding and use both ends of the permanent magnet to produce an electrical output signal thereby resulting in both coils being used for the purpose of generating an electrical output signal. In the prior art devices having a coil form which supports a single coil, the coil form thickness is controlled to reduce the mass thereof. Where a rotational movement of the coil form is to be restricted as earlier described, this is obtained by use of the pin and slot arrangement.

In the present invention, the coil form supports a single coil of electrical conductors which is used for generating the electrical output signal. The coil form may be designed to have unrestricted rotational movement by means of sliding contacts and springs or to have restricted rotational movement the limits of which are established by a pin and slot arrangement.

In the present invention, the coil form has an added band of highly conductive material formed around the periphery thereof. In this unique coil form, the selection of a highly conductive material produces a highly desirable increased damping characteristics of the sensor even though the mass of the coil form is increased.

The increase in damping characteristics is attributed to the functioning of the conductive metal band as a single, shorted turn winding. The metal band responds to transversing the magnetic lines of force to generate a back current and electromotive force which generate a magnetic field which retards coil form movement.

This feature has wide utilization and application in geophones, seismometers and vibration sensing devices. Of course, other arrangements, such as a single band of conductive metal, may be applied to the periphery of the coil form.

Another advantage of the present invention is that at higher natural frequencies, the damping characteristic of the geophone is many times higher than that of prior art devices.

Yet another advantage of the present invention is that the coil form can be utilized in vibration sensing devices where the coil form is permitted to rotate or be responsive to rotational forces applied thereto.

And yet another advantage of the present invention is that rotation of the coil form of a vibration sensing transducer or geophone may be limited or prevented. This may be desirable where the transducer or geophone is subjected to high rotational accelerations, to accelerations such as, for example rapid and deacceleration in the order of several thousandths G's or other similar controlled forces.

BRIEF DESCRIPTION OF THE DRAWING

The foregoing and other advantages and features of the invention will become apparent from the following description of the preferred embodiment when considered together with the illustration in the accompanying drawing which includes the following figures.

DESCRIPTION OF THE PREFERRED EMBODIMENT

Figure 1:
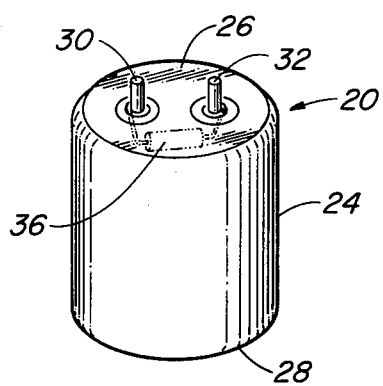
FIG. 1 is a pictorial representation of an assembled geophone having an external shunt resistor shown as a dashed element, across the output terminal thereof.

FIG. 1 illustrates a pictorial representation of a transducer, generally designated 20, for sensing vibrations by means of transporting a coil of electrical conductors relative to a fixed permanent magnet in response to vibrations. In the preferred embodiment, the transducer 20 is a geophone. The geophone has a metal housing 24 and means defining a top end 26 and a bottom end 28. The top end 26 includes means defining an output terminal formed of a pair of electrically insulated terminal pins 30 and 32, respectively, which are located exterior to the housing 24 and the top end 26.

In FIG. 1, a shunt resistor 36 is represented by a dashed resistor showing the physical location thereof across the terminal pins 30 and 32.

Figure 2:
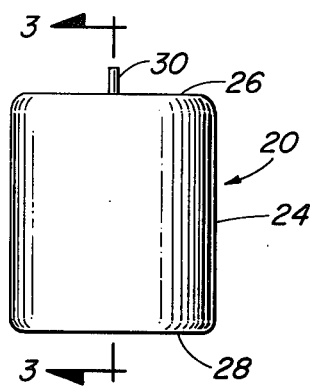
FIG. 2 is a front view of a geophone incorporating the teachings of this invention.

FIG. 2 shows the metal housing 24, top end 26 having terminal pin 30 extending therefrom and bottom end 28. The geophone is normally electrically connected to a cable (not shown) at terminal pins 30 and 32 to receive electrical output signal generated by the geophone 20 across the terminal pins 30 and 32.

Figure 3:
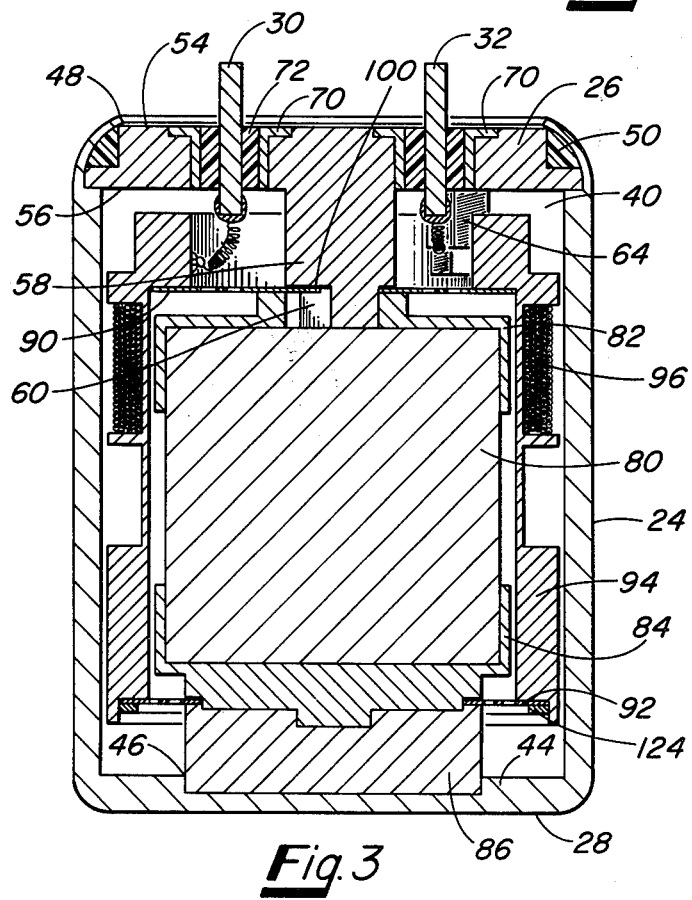
FIG. 3 is a cross section of an assembled geophone taken along section lines 3—3 of FIG. 2.

The section in FIG. 3 shows in greater detail the interior of the geophone. The metal housing 24 has a hollowed-out center area or void 40. The metal housing 24 terminates in a unitary bottom end 28 as shown in FIG. 3. Bottom end 28 functionally has an integral metal closed end 44 having a centered recessed area 46. In addition, the housing 24 has an open end 48 which receives the top end or header 26 therein. "O" Ring 50 is positioned between the open end 48 and the housing 24 to form a tight, water-proof seal between the header 26 and the housing 24.

The header 26 has a top surface 54 and a bottom surface 56, which bottom surface 56 is interior to the housing 24.

The bottom surface 56 has an elongated spacing member 58 extending from the center thereof which terminates in a slotted tip 60. In addition, the header 26 has a pair of elongated ribs 64 (shown in greater detail in FIG. 10) located at the periphery of the bottom surface 56. The elongated ribs 64 extend towards and are in radial alignment with the center of the spacing member 58 and are in alignment with each other. The header 26 has a pair of insulated terminals comprising a metal insert 70, and insulating material 72, and terminal pins 30 and 32, referenced in FIG. 1. The terminal pins 30 and 32 extend from the top surface 54 of the header 26, extended through the header 26 into the interior of the housing 24.

A permanent magnet 80 having top and bottom pole caps 82 and 84 respectively, is positioned in a spaced relationship within the hollowed-out central area 40 of the housing 24. The permanent magnet 80 extended axially through the housing 24 from the tip 60 of spacing member 58 to the closed end 44 of the housing 24. A annular shaped non-magnetic or magnetic insulating support member 86 is positioned within the centered recessed area 46 of the housing 24. The annular shaped member 86 engages magnet 80 through the bottom pole face member 84.

A resilient means such as, for example, a spring assembly formed of a pair of disc shaped vertically deflectable torsion top and bottom springs 90 and 92, respectively, are coupled between the permanent magnet 80 and a coil form 94. The disc shaped top spring 90 and the disc shaped spring bottom 92 function to movably support the coil form 94 and a coil of electrical conductors 96 formed around the coil form 94 for movement in a direction substantially parallel to the axis of the permanent magnet 80 in response to a sensed vibration.

The coil form 94 is formed of a highly conductive metal such as, for example, an aluminum-copper alloy generally referred to as Type 2011-T3. The metal coil form 94 is positioned in the space formed between the housing 24 and the permanent magnet 80 and the coil form 94 encloses the permanent magnet 80. The coil form 94 engages and cooperates with the disc shaped springs 90 and 92 such that the coil form is permitted to move a direction substantially parallel to the axis of the permanent magnet 80.

Figure 8:
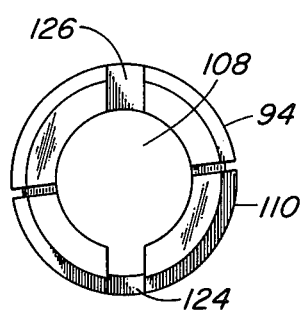
FIG. 8 is a top view of a preferred embodiment of an improved coil form of the present invention.
Figure 9:
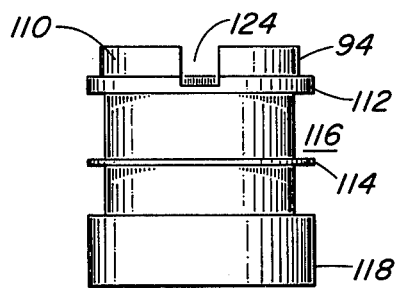
FIG. 9 is a front view of the improved coil form of FIG. 8.

The top spring 90 (shown in FIG. 4) has an inner insert 100 and an outer tab 102. Inner insert 100 of spring 90 is positioned within the slotted portion of tip 60 of the elongated spacing member 58. The outer tip 102 engages and cooperates with a slot in the coil form 94, which slot is shown in FIGS. 8 and 9. The spring 90 is located in a space formed between the tip 60 and the elongated spacing number 58, the bottom of the space being defined by the top pole face 82. The gap formed between the pole face 82 and elongated spacing member 58 is of a sufficient dimension to enable the spring to be loosely held therein such that the spring is unclamped and permitted to have a very small amount of movement therebetween. Bottom spring 92 is positioned between the bottom pole face 84 and the annular shaped support 86 as shown in greater detail in FIGS. 12 and 13. In a similar manner to spring 90, spring 92 is likewise loosely positioned in a gap which gap is formed by a space between the bottom pole face 84 and annular shaped member 86.

Figure 4:
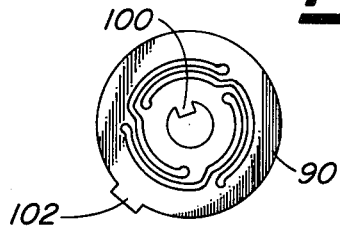
FIG. 4 is a top view of a top disc shaped vertically deflectable torsion spring.
Figure 6:
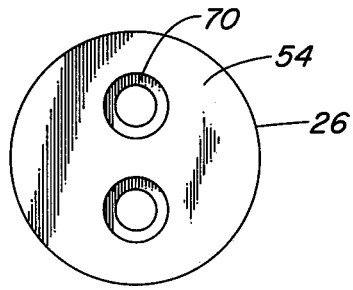
FIG. 6 is a top view of a header.
Figure 7:
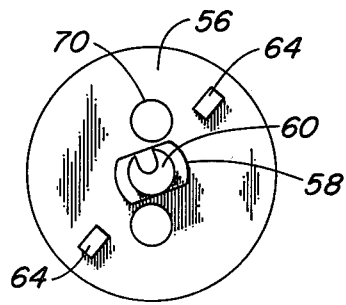
FIG. 7 is a bottom view of the header of FIG. 6.

FIGS. 6 and 7 show in greater detail the top surface 54 and bottom surface 56 of header 26. The metal insert 70, which supports the insulated terminal pins 30 and 32 are likewise illustrated. In the bottom view of header 26 as illustrated in FIG. 7, the elongated spacing member 58 and the slotted tip member 60 are shown in greater detail. Inner insert 100 of spring 90, illustrated in FIG. 4 is intended to be positioned within the slotted portion of tip 60, shown in Figure, when assembled as illustrated in FIG. 3. FIG. 7 also shows the elongated ribs 64 located on the periphery of the bottom surface 56 of header 26. The alignment between each of the elongated ribs 54 and the center of the elongated spacing member 58 is clearly shown in FIG. 7.

Referring now the FIGS. 8 and 9, the details of the improved coil form of the present invention are shown. The coil form 94 has an aperture 108 extending axially through the center thereof. The opening formed by aperture 108 is adapted to enclose the permanent magnet (illustrated as 80 in FIG. 3). The coil form 94 includes a surface 110 which is adjacent the interior of the housing 24 illustrated in FIG. 3. The coil form has at one end thereof a pair of spaced parallel axially aligned circumferentially extending walls 112 and 114 which defines a passageway 116. The passageway 116 is adapted to enclose the wire coil 96 illustrated in FIG. 3.

The other end of the coil form 94 has a solid section or band 118 formed of a highly conductive metal positioned around and in axial alignment with the walls 112 and 114.

It is the addition of the band of highly conductive material 118 which constitutes the most significant feature of the present invention. When the coil form 94 is assembled into an operating geophone 20, (which is illustrated in FIG. 1), the coil form 94 including the band or solid section of highly conductive metal 118 moves relative to the permanent magnet in response to a vibration. The band or solid section 118 traverses the magnetic lines of force emanating from the permanent magnet 80 (illustrated in FIG. 3) and generates in response thereto an electromotive force and current therein which produces a magnetic field acting in a direction of traverse of the coil form 94 causing damping of movement of the coil form 94. A pair of opposing alignment slots 124 and 126 are formed in one end of the coil form 94. If desired, a single slot may be used at either end of the coil form 94, provided, of course, that a corresponding aligned elongated tab is defined in the housing 24.

In order to fully explain the significance of the improved coil form, a brief review of the factors which affect the determination of the damping characteristics of a geophone is now presented.

The overall open circuit damping, $b_o$, is determined with the geophone having an open circuit across the output terminals, i.e., no current flowing through the coil. The equation for defining the damping characteristics of the geophone is as follows:

$$B = 2b_o \sqrt{KM} = 2b_o W_n M$$

wherein:
  $B$ = damping force per unit of velocity gm-sec (or linear coefficient of damping)
  $b_o = (B/C)_c$ open circuit damping (fraction of critical damping)

$$W_n = 2f_n = \sqrt{K/M}$$

where $f_n$ is the undamped natural frequency
  $M$ = total moving mass (grams-sec$^2$ per cm)
  $K$ = Spring constant (grams per cm)
  $C_c$ = critical damping as defined by the formula $$C_c = 2\sqrt{KM} = (gm\ sec/cm)$$

In a vibration sensing transducer or geophone, the goal is to have $b_o$ be as high as possible for most applications. At the natural frequencies, the goal is to have a $b_o$ of about 65%, or higher, if desired. At a fixed natural frequency, the $b_o$ can be increased by increasing the damping force B. On the other hand, if the mass of the coil form is increased, $b_o$ decreases.

The overall damping force B per unit of velocity of geophone is a function of the flux and the coil form conductivity and can be increased by either increasing the flux of the magnet or increasing the conductivity of the coil form, or both. The damping force is related to the open circuit damping of the geophone by the following formula: $b_o = (B/2W_nM)$.

In the present invention the total damping, represented by $b_t$, is made up of several components as shown by the following equation:
  $b_t = b_o + b_c + b_e$ wherein:
  $b_o$ = open circuit damping;
  $b_c$ = current damping in coil; and
  $b_e$ = additional open circuit damping due to back emf and current generated in the added coil form damping band.

The additional component of damping contributed by this invention is the damping represented by the component "$b_e$". The component $b_e$ represents the electromagnetic damping force generated by the back electromotive force and current generated by the band or shorted turn of metal on the coil form due to the increased conductivity of this band of metal. Although the mass of the coil form is increased by the addition of or retention of a band of electrical conductive metal around the end of the coil form as illustrated in FIGS. 8 and 9, reduction in open circuit damping due to increased coil form mass is more than offset by the electromagnetic damping generated by the shorted turn.

This results in a unique and novel electromagnetic damping components which substantially increases the total damping characteristic of the geophone. This becomes very significant as the natural frequency of the geophone or vibration sensing transducer increases. By use of the teachings of this invention and as supported by the disclosure, it is not uncommon to have the total damping increase by a factor of 2 to 3 in a vibration sensing transducer of geophone using the unique coil form of the present invention relative to the damping of a device using a normal or known type of coil form.

Figure 5:
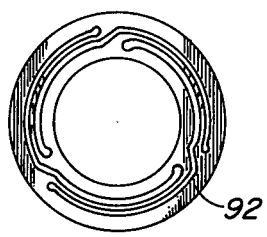
FIG. 5 is a top view of a bottom disc shaped vertically deflectable torsion spring.
Figure 10:
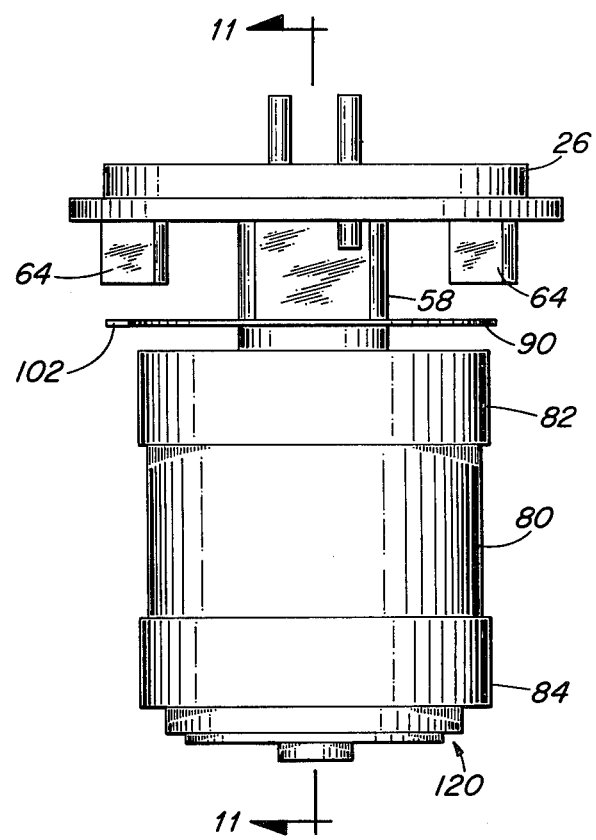
FIG. 10 is a front view of a header, top disc shaped spring and permanent magnet sub assembly.
Figure 11:
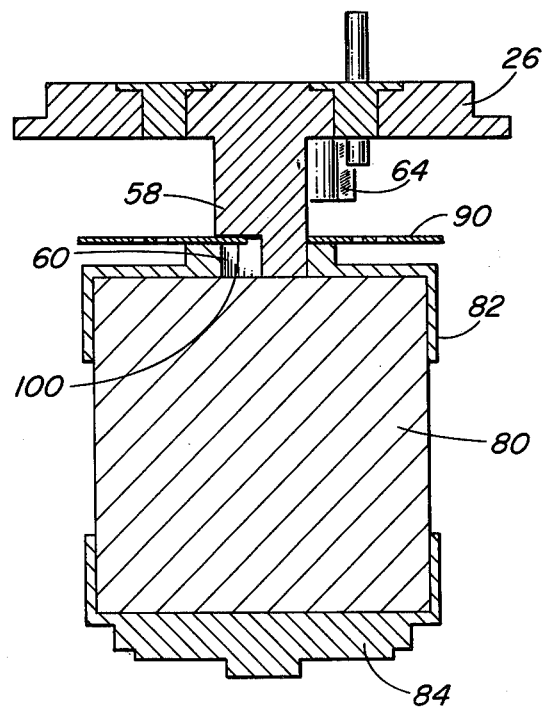
FIG. 11 is a cross section view of the sub assembly of FIG. 10 taken along section line 11—11 thereof.

Referring now to FIGS. 10 and 11, the details of the sub-assembly formed of the header 26, top disc shaped spring 90, top pole piece 82, permanent magnet 80 and bottom pole piece 84 are shown. The bottom pole piece 84 has a plurality of annular shaped concentric rings extending therefrom generally designated as 120 which mate or cooperate with the annular shaped nonmagnetic member 86 as shown in FIG. 3. As stated herein before, the top disc shaped spring 90 is coupled between the top of the permanent magnet 80 by pole piece 82 and the header 26 through the elongated spacing member 58. Elongated ribs 64, illustrated in FIG. 10, are adapted to engage and cooperate with the aligned slots 124 and 126, in coil form 94 as illustrated in FIGS. 8 and 9. The elongated tabs 64 and the width of the slots 124 and 126 determine the permitted degree of rotational movement of the coil form. The degrees of rotation and the limitations thereof are selected so as to permit rotation of the coil form over a degree of rotation without exceeding the elastic limit of the springs 90 and 92 of FIGS. 4 and 5.

FIG. 11 shows the coupling between the top disc shaped spring 90 wherein the inner tab 100 is seated into the slotted tip 60 formed in the elongated spacing member 58. In the preferred embodiment, this arrangement results in the coil form being supported for movement in a vertical direction relative to the axis of the permanent magnet 80.

Figure 12:
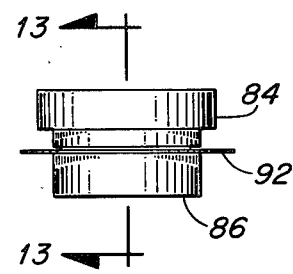
FIG. 12 is a front view of a bottom pole face, bottom disc shaped spring and annular shaped support member sub assembly.
Figure 13:
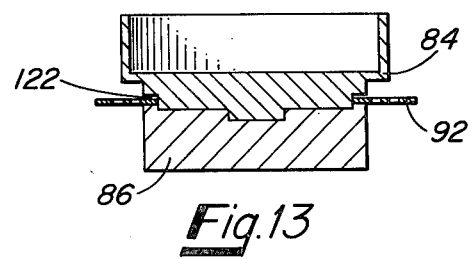
FIG. 13 is a section of the sub assembly of FIG. 12 taken along section line 13—13 thereof.

FIG. 12 shows the coupling relationship between the bottom disc shaped spring 92, the bottom pole piece 84, and annual shaped support member 86. In the cross sectional view of FIG. 13, it is clearly shown that the bottom disc shaped spring 92 is coupled to the bottom pole piece 84 and annular shaped support member 86. By having a space of gap 122 therebetween, the spring characteristics are not affected and the spring is permitted to rotate or otherwise be deflected without the generation of additional spurious signals, a shifting in frequency or the introduction of other undesirable disturbances which would result if the bottom spring 92 was clamped or otherwise rigidly held between the pole piece 84 and annual shaped member 86. Of course, a similar space or gap is necessary for the top spring 90. The bottom spring 92 is attached to the coil form 94 by spring retainer ring 124 shown in FIG. 3.

Referring again to FIG. 3, in operation the transducer is responsive to a vibration by the coil form 94 moving vertically relative to the permanent fixed magnet 80. When this occurs, the electrical conductor from coil 96 traverses the magnetic lines of force from the permanent magnet 80 to generate an electrical output signal which appears across output terminal 30 and 32 which are electrically connected to the coil 96. By connecting a shunt resistor of a selected ohmic value between terminals 30 and 32 (as illustrated by the dashed in shunt resistor 36 in FIG. 1), the magnitude of the current flow in the coil 96 can be controlled. Essentially, the shunt resistor is selected to be of an ohmic value to establish a magnitude. Essentially, the shunt resistor is selected to be of an ohmic value to establish a magnitude of current in the coil windings of coil 96. The current in coil 96 generates a damping force which, when combined with the open circuit damping force, controls the damping responses of the geophone in a normal manner.

Concurrently, a current is induced in the band or shorted turn 118 of coil form 94 as the band 118 traverses the magnetic lines of force emanating from the permanent magnet 80 which generates a back electromotive force. The resultant electromagnetic force produces an electromagnetic damping force which significantly contributes to the total damping characteristics of the geophone as described herein.

The path traversed by the magnetic flux is specifically controlled and determined by the above components.

In particular, the magnetic flux of lines of force emanate from the permanent magnet 80, pass through the sides of the upper pole piece 82, are concentrated in coil 96, pass through the thin walls of the housing 24, concentrated through the band 118 on coil form 94 and through the side of the bottom pole piece 84 back into the permanent magnet 80.

In one embodiment of a geophone using the teachings of the invention, the following characteristics and specifications were established:

(a) the natural frequency of the geophone was 26 Hz
(b) the coil impedance with 475 ohms
(c) the output electrical voltage was determined to be 385 milivolts per inch per second of velocity
(d) magnet material used was alnico 8.
(e) the total damping or $b_o + b_e$ was 30%.

By the addition of a shunt resistor, the overall damping was increased resulting in the following changes in the electrical output voltages:

| Shunt Resistor | Damping | $E_o$ |
| --- | --- | --- |
| 680 ohms | 40% | .227 v/in/sec |
| 300 ohms | 45% | .150 v/in/sec |
| 120 ohms | 50% | .078 v/in/sec |

$F_n$ vertical position 26 Hz ± 1 Hz

In the absence of the teachings of this invention, the anticipated damping characteristics $b_o$ alone would have been in the order of about 12% and in operation the total damping characteristics is the sum of the open circuit damping characteristics, the coil current damping characteristics, and the band or shorted turn damping characteristics.

The coil form of the present invention may be used in a wide variety of sensors, transducers, geophones, vibration sensing devices or the like. The coil form may be of the rotating type, limited rotating type or non-rotating type. The band of conductive material may be integral with the coil form, formed of a different material or, be formed of a number of shorted turns of a highly conductive metal which functionally generates a back emf; the sole purpose of which is to control or establish reduced damping characteristics of the transducer.

What is claimed is:

1. A geophone for sensing vibrations comprising a metal housing having a hollowed-out central area and means defining a closed end including a centered recessed area and an opened end;

a header having a top surface and a bottom surface, said header being positioned in the opened end of the housing with the bottom surface interior to the housing, said bottom surface having an elongated spacing member extending from the center thereof and terminating in a slotted tip and a pair of elongated ribs located at the periphery of the bottom surface and extending towards and in radial alignment with the center of the spacing member and each other, said header having a pair of insulated terminals extending therethrough into the interior of the housing;

a permanent magnet positioned in a spaced relationship within the hollowed-out central area of the housing and extending axially therethrough from the tip of the spacing member to the closed end of the housing;

an annular shaped magnetic insulator support member positioned within the centered recessed area of the closed end of the housing and said permanent magnet;

a spring assembly formed of a pair of disc shaped vertically deflectable torsion springs, one of which is coupled to the slotted tip and positioned between the spacing member and permanent magnet and positioned between the annular shaped member and permanent magnet; and a coilform fabricated from an electrically conductive metal positioned in the space within the housing and enclosing said permanent magnet, said coilform engaging and cooperating with said pair of springs for movement in a direction substantially parallel to the axis of said permanent magnet, said coilform including a surface contiguous said housing and having at one end thereof a pair of spaced parallel axially aligned circumferentially extending walls defining a passageway which encloses a wire coil adapted to be electrically connected to the pair of terminals and having at the other end thereof a solid section formed of an electrically conductive metal positioned in the periphery of the coilform on the same side as said passageway and having a radial thickness substantially equal to the thickness of said extending walls; said one end having a pair of slots formed at the edge thereof, positioned to movably engage and cooperate with said pair of elongated ribs to limit rotational movement of the coilform.

2. The geophone of claim 1 further comprising a shunt resistor electrically connected across the wire coil and selected of an ohmic value to establish the magnitude of the electrical output signal at a minimum level and a damping current in the coil at a maximum level magnitude of the electrical output signal.

3. The geophone of claim 2 wherein the frequency responses of the geophone is between at least one hertz to about 300 hertz and the total damping characteristics thereof is the sum of open circuit damping characteristic, coil current damping characteristic and band of metal damping characteristic.

4. The geophone of claim 2 wherein the resistance value of said shunt resistor is selected to be between about 120 ohms and about 680 ohms.

5. The geophone of claim 4 wherein the resistance value of said shunt resistor is selected to be about 475 ohms.

6. The geophone of claim 1 wherein said direction of movement of the coilform relative to the permanent magnet is limited by the spring assembly to a vertical direction of movement.

7. The geophone of claim 6 wherein the pair of disc-shaped vertically deflectable torsion springs support the coilform for movement in the vertical direction and are responsive to rotational movement of the coilform over the degree of rotation established by the ribs and slots without exceeding the elastic limit of the springs.

* * * * *